United States Patent [19]
Morgan

[11] 3,991,016
[45] Nov. 9, 1976

[54] POLY(1,4-BENZAMIDE) COPOLYMERS

[75] Inventor: Paul Winthrop Morgan, West Chester, Pa.

[73] Assignee: E. I. Du Pont de Nemours and Company, Wilmington, Del.

[22] Filed: July 30, 1974

[21] Appl. No.: 493,068

[52] U.S. Cl. ............... 260/47 CZ; 260/47 XA; 260/49; 260/78 A
[51] Int. Cl.² ............ C08G 75/12; C08G 69/42; C08G 75/18; C08G 75/20
[58] Field of Search .......... 260/47 CZ, 78 A, 49, 260/47 X

[56] References Cited
UNITED STATES PATENTS

| | | | |
|---|---|---|---|
| 2,688,011 | 8/1954 | Wheatley et al. | 260/78 |
| 3,225,011 | 12/1965 | Preston et al. | 260/78 |
| 3,546,178 | 12/1970 | Caldwell et al. | 260/75 |
| 3,598,864 | 8/1971 | Caldwell et al. | 260/47 |
| 3,652,510 | 3/1972 | Blomberg | 260/78 |
| 3,699,085 | 10/1972 | Johnson | 260/78 |

*Primary Examiner*—Lester L. Lee

[57] ABSTRACT

This invention relates to novel copolymers containing from about 80 to about 95 mol % of

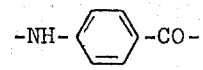

units in the polymer chain.

5 Claims, No Drawings

POLY(1,4-BENZAMIDE) COPOLYMERS

BACKGROUND OF THE INVENTION

Preston et al. U.S. Pat. No. 3,225,011 and Kwolek U.S. Pat. No. 3,600,350 teach preparation of polyamides related to products of the present invention.

SUMMARY OF THE INVENTION

The present invention provides novel poly(1,4-benzamide) copolymers.

More specifically, this invention provides novel copolymers comprising from about 80 to about 95 mol % and preferably no more than about 90 mol % of

units with other repeating units selected from

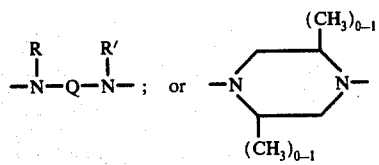    (1)

and at least one of

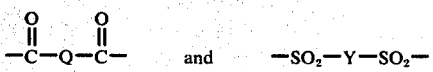

wherein Q represents a divalent alkylene radical of up to 6 carbon atoms and includes the 1,4-cyclohexylene radical; R and R', which may be the same or different, are selected from the group of an H atom and methyl radicals; and Y represents at least one member of the group of m- or p-phenylene radicals which may bear inert substituents;

    (2)

wherein Y is defined as above; or

    (3)

wherein A is the residue of a p-oriented diphenolic reactant comprising one or two 6-membered carbocyclic ring(s) which may bear inert substituents; Y is defined as above and wherein X represents a member selected from the group of

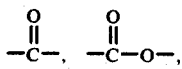

and —SO$_2$— radicals. It is to be understood that the X's in the formula —X—Y—X—, may be the same or different.

Shaped articles prepared from the above-described copolymers, such as films and fibers, are also comprehended by this invention.

The copolymers of this invention exhibit inherent viscosities of at least about 0.2, preferably above 0.6, when measured by procedures subsequently described herein.

DESCRIPTION OF THE PREFERRED EMBODIMENTS

Cyclic Sulfones and Acid Acceptors

The processes which are described and exemplified hereinafter employ as a solvent a cyclic sulfone corresponding to the formula

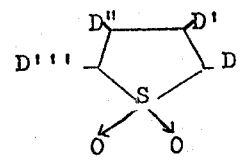

wherein D, D', D'', and D''', which may be the same or different, represent hydrogen or methyl radicals. Preferred cyclic sulfone solvents include tetramethylene sulfone; 2-methyltetramethylene sulfone; 3-methyltetramethylene sulfone; 2,4-dimethyltetramethylene sulfone; 2,3,4-trimethyltetramethylene sulfone; and 2,3,4,5-tetramethyltetramethylene sulfone. The sulfones may also be identified as the corresponding thiophene derivatives, e.g., tetramethylene sulfone is tetrahydrothiophene-1,1-dioxide.

The processes also employ an organic tertiary amine as an acid acceptor which will react with the acidic by-product of the polymerization reaction to form a salt. Tertiary amines useful for this purpose have a basic strength equal to or greater than that of pyridine ($K_b = 1.4 \times 10^9$ at 25° C.). Useful tertiary amines include N,N-diethylaniline, pyridine, 3-methylpyridine, 4-methylpyridine, 2,4-lutidine, 2,5-lutidine, 2,6-lutidine, 3,5-lutidine, ethyldiisopropylamine, trimethylamine, triethylamine, tripropylamine, triisopropylamine, and dimethylethylamine.

Monomers and Intermediates

The poly(1,4-benzamide) unit is derived from p-aminobenzoyl halide salts of the formula

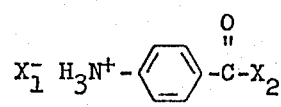

wherein $X_1$ and $X_2$ are individually selected from chlorine and bromine. p-Aminobenzoyl chloride hydrochloride is the preferred monomer. Other useful monomers include p-aminobenzoyl bromide hydrobromide and p-aminobenzoyl chloride hydrobromide.

Diamines useful for providing the repeating units:

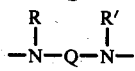

or

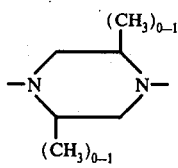

defined hereinbefore, include ethylenediamine, trimethylenediamine, tetramethylenediamine, pentamethylenediamine, hexamethylenediamine, piperazine, 2,5-dimethylpiperazine, 2-methylpiperazine, n,n'-dimethylhexamethylenediamine, and N,N'-diethyltetramethylenediamine.

The radicals represented by formula

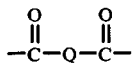

are derived from suitable derivatives of isophthalic and terephthalic acids; the diacid chlorides are preferred and include chloroterephthaloyl chloride and 5-methylisophthaloyl chloride. The disulfonyl radicals represented by formula $-SO_2-Y-SO_2-$ are derived from suitable derivatives of m- and p-benzenedisulfonic acid; the disulfonyl chlorides are preferred and include methyl-1,4-benzenedisulfonyl chloride and chloro-1,4-benzenedisulfonyl chloride. The diacyl or disulfonyl radicals are present in substantially stoichiometric amounts with the diamine-derived radicals.

The benzoate radicals represented by formula $-O-Y-CO-$ are derived from suitable derivatives of m- and p-hydroxybenzoic acid; the acid chlorides are preferred. Preferred intermediates include 3-hydroxybenzoyl chloride; 3-methoxy-4-hydroxybenzoyl chloride; 3,5-dichloro-4-hydroxybenzoyl chloride; 3-chloro-4-hydroxybenzoyl chloride.

The diphenoxy radicals represented by formula $-O-A-O-$ are derived from bisphenols having one or two aromatic rings. Suitable bisphenols include 4,4'-isopropylidene diphenol (Bisphenol A); 4,4'-isopropylidene bis(2,6-dichlorophenol); 4,4'-cyclohexylidenediphenol; 4,4'-methylenediphenol; hydroquinone; chlorohydroquinone; 4,4'-oxydiphenol; 4,4'-hexafluoroisopropylidenediphenol; and the like.

The divalent radicals represented by formula $-X-Y-X-$ are derived from (1) iso- and terephthalic acids (used as the acid chlorides), (2) the bischloroformates of hydroquinone and resorcinol, (3) the disulfonyl chlorides of m- and p-benzenedisulfonic acids and substituted derivatives thereof (e.g., the chloro- and methyl derivatives) and (4) comonomers containing mixed functional groups such as 4-chloroformylbenzene sulfonyl chloride and 4-chloroformylbenzenechlorocarbonate. The diacyl, disulfonyl or bischloroformyl radicals are present in substantially stoichiometric amounts with the diphenoxy radicals.

Polymerization Conditions

Preparation of Copolymers

The novel copolymers are prepared by low temperature ($<50°$ C.) reactions, under anhydrous conditions. Appropriate monomers (e.g., p-aminobenzoyl chloride hydrochloride, aliphatic diamine and aromatic diacid chloride) are combined with the sulfone medium in a dry reaction vessel fitted with a stirrer and optionally cooled (e.g., with ice) and/or swept with an inert gas such as nitrogen. To this stirred combination is added the tertiary amine acid acceptor. If desired, the acid acceptor may be added before all of the monomers have been combined. After the reaction system is stirred for a few hours, there may be obtained, e.g., a viscous solution of the polymer, a difficulty stirrable paste or dry solid, or a mixture of polymer precipitate and the reaction medium, depending on the reaction system employed. The polymer may be isolated by conventional procedures as shown in the Examples.

Chain terminators may be used in the polymerization processes, if desired. Among the suitable chain terminators are compounds which can react monofunctionally with the acid chloride ends of these polymers such as ammonia, monoamines (e.g., ethylamine, dimethylamine, diethylamine, butylamine, dibutylamine, cyclohexylamine, aniline, etc.), compounds containing a single amide-forming group such as N,N-diethylethylenediamine, hydroxylic compounds such as methyl alcohol, ethyl alcohol, isopropyl alcohol, phenol, etc., and compounds which can react monofunctionally with the amine ends of the products such as other acid chlorides (e.g., acetyl chloride), acid anhydrides (e.g., acetic anhydride, phthalic anhydride), and isocyanates (e.g., phenyl isocyanate, ethyl isocyanate, etc.). p-Aminobenzoic acid is a useful terminator.

Shaped Article Preparation

The copolymers described above may be dissolved in appropriate solvents and formed into useful shaped articles, e.g., spun into fibers, as shown in the Examples. The solutions may be extruded into fibers by conventional wet- and dry-spinning techniques and equipment. In wet-spinning, an appropriately prepared solution is extruded into a suitable coagulating bath, e.g., a water bath or aqueous salt baths. Dry-spinning may be accomplished by extruding the solution into a heated current of gas whereby evaporation occurs and fibers are formed.

After being formed, the fibers may be passed over a finish application roll and wound up on bobbins. Development of maximum levels of filament and yarn properties is assisted by soaking the bobbins in water or mixtures of water and water miscible inert organic liquids (e.g., acetone, ethyl alcohol, glycerol, N,N-dimethylacetamide) to remove residual solvent and/or salt, after which the fibers are dried. Removal of the salt and solvent may also be accomplished by running the fiber or yarn through aqueous baths on the run, by flushing the bobbins with water as the yarn is formed, and by soaking or washing skeins, rather than bobbins, of yarn.

The solutions comprising the copolyamides of this invention may be formed into strong self-supporting films by conventional wet-extrusion methods.

It will be understood that the usual additive such as dyes, fillers, UV stabilizers, antioxidants, etc., can be incorporated in with the (co)polymers for the purposes intended prior to shaped article preparation.

EXAMPLES

The following nonlimiting examples are illustrative of the practice of the preferred embodiments of this invention. In these examples, inherent viscosity ($\eta$inh)

has been determined in accordance with the following equation:

$$\eta\text{inh} = \frac{\ln(\eta\text{ rel})}{C}$$

wherein ($\eta$rel) represents the relative viscosity, (C) represents a concentration of 0.5 gram of the polymer in 100 ml. of the solvent. The relative viscosity ($\eta$rel) is determined by dividing the flow time in a capillary viscometer of a dilute solution of the polymer by the flow time for the pure solvent. The dilute solution used herein for determining ($\eta$rel) is of the concentration expressed by (C) above; flow times are determined at 30° C., using N,N-dimethylacetamide containing 6.5% by weight lithium chloride as solvent.

Fiber properties of tenacity, elongation, and initial modulus are coded as T/E/Mi and are in units of grams/denier, percent, and grams/denier, respectively.

EXAMPLE I

This example illustrates the preparation of copolyamides from p-aminobenzoyl chloride hydrochloride, aliphatic diamines, and an aromatic diacid chloride according to this invention.

Part A

Into a dry tubular flask are added 3.46 g. (0.018 mole) of p-aminobenzoyl chloride hydrochloride, 0.114 g. (0.001 mole) of 2,5-dimethylpiperazine, and 45 ml. of 2,4-dimethyltetramethylene sulfone. To the vigorously stirred contents of the flask are added 7.81 ml. of ethyldiisopropylamine; a clear solution forms in the flask. To this stirred system is added 0.203 g. (0.001 mole) of terephthaloyl chloride. The reaction mixture becomes viscous and finally becomes unstirrable. After the reaction mixture is permitted to stand for 2 hr., it is combined with water to precipitate the copolyamide which is collected, washed well with water and 2B alcohol, and dried. The copolyamide product weighs 2.32 g., $\eta$inh = 1.12, and is comprised of random repeating units of

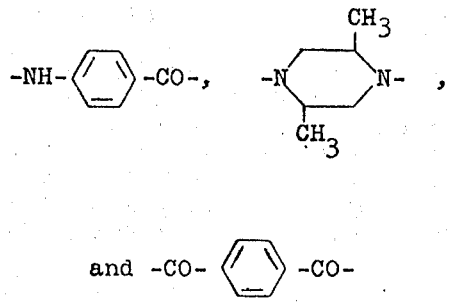

in the molar ratio of 90:5:5, respectively.

The copolyamide is soluble in N,N-dimethylacetamide containing 6.5% by weight lithium chloride. An extremely viscous, clear solution of the copolyamide, 10% by weight, is prepared in this amide-salt mixture. A film is dry cast from this solution and is dried in a vacuum oven at 60° C. under a slow flow of air. The dried film is soaked in water to remove the salt (3 changes of water: at 4, 8, and 24 hours). The washed and dried film is flexible and clear.

Part B

Into a dry tubular flask are added 3.46 g. (0.018 mole) p-aminobenzoyl chloride hydrochloride, 0.116 g. (0.001 mole) of hexamethylenediamine, and 45 ml. of 2,4-dimethyltetramethylene sulfone. To this vigorously stirred system are added 7.81 ml. of ethyldiisopropylamine. To the resulting clear solution is added 0.203 g. (0.001 mole) of terephthaloyl chloride. In the course of being stirred for 2 hr., the solution becomes viscous. The viscous reaction mixture is permitted to stand overnight before being combined with water to precipitate the polymer which is collected, washed three times with water and once with 2B alcohol, and vacuum dried. The copolyamide obtained weighs 2.31 g., exhibits an inherent viscosity of 0.45 and is comprised of random repeating units of

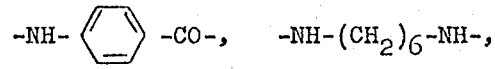

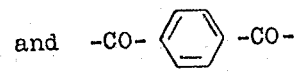

in the molar ratio of 90:5:5, respectively.

EXAMPLE II

This example illustrates the preparation of a copolymer containing aromatic polyamide, polyester, and polycarbonate linkages.

Into a dry tubular flask, fitted with a stirrer and swept by a stream of dry nitrogen, are placed 30 ml. of 2,4-dimethyltetramethylene sulfone, 3.46 g. (0.018 mole) of p-aminobenzoyl chloride hydrochloride, and 0.23 g. of (0.001 mole) of 4,4'-isopropylidenediphenol. To this stirred system are added 12 ml. of pyridine. The reaction mixture becomes viscous and 0.24 g. (0.001 mole) of hydroquinone bischloroformate is added. The reaction mixture remains viscous; stirring is continued for about 2 hr. The contents of the flask are combined with water to precipitate the copolymer which is isolated, washed, and dried. The copolymer obtained weighs 2.25 g., $\eta$inh = 0.84, and is comprised of random repeating units of

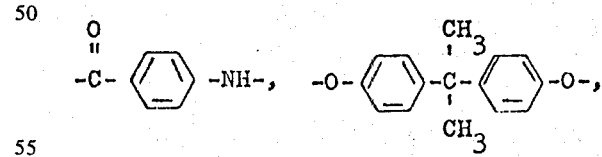

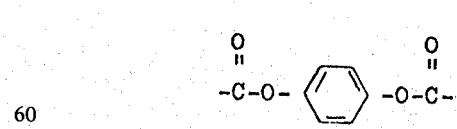

in the molar ratio of 90:5:5, respectively.

EXAMPLE III

This example describes the preparation of a copolymer containing aromatic polyamide and polyester units according to the process of this invention.

Into a dry tubular flask are placed 45 ml. of 2,4-dimethyltetramethylene sulfone, 3.46 g. (0.018 mole) of p-aminobenzoyl chloride hydrochloride, and 0.11 g.. (0.001 mole) of hydroquinone. To this vigorously stirred system are added 7.81 ml. of ethyldiisopropylamine. To the resulting clear solution is added 0.203 g. (0.001 mole) of terephthaloyl chloride. The reaction mixture becomes more viscous until it becomes unstirrable. After the reaction mixture is permitted to stand for 2 hr., it is combined with water to precipitate the polymer which is isolated, washed with water and 2B alcohol, and dried. The copolymer obtained weighs 2.32 g., $\eta$inh = 1.29, and is comprised of random repeating units of

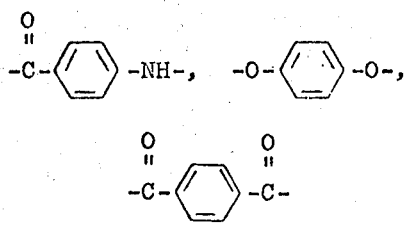

in the molar ratio of 90:5:5, respectively.

EXAMPLE IV

This example illustrates the preparation of a copolymer containing aromatic polyamide and polyester linkages, prepared according to the process of this invention.

Part A

Into a dry tubular flask are added 3.11 g. (0.016 mole) of p-aminobenzoyl chloride hydrochloride, 0.313 g. (0.002 mole) of 3-hydroxybenzoyl chloride, and 45 ml. of 2,4-dimethyltetramethylene sulfone. To this stirred system are added 10.2 ml. of pyridine. The reaction mixture becomes slightly viscous and is stirred for 2 hr. after which it is permitted to stand overnight. The reaction mixture is then combined with water to precipitate the polymer which is isolated, washed with water and with 2B alcohol, and dried. The copolymer obtained weighs 2.35 g., exhibits an inherent viscosity of 0.88 and is comprised of random repeating units of

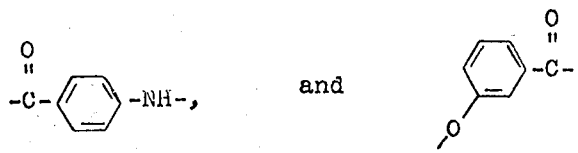

in the molar ratio of 8:1, respectively.

Part B

Into a dry tubular flask are placed 45 ml. of 2,4-dimethyltetramethylene sulfone, 3.11 g. (0.016 mole) of p-aminobenzoyl chloride hydrochloride and 0.373 g. (0.002 mole) of 4-hydroxy-3-methoxybenzoyl chloride. To this stirred system are added 10.2 ml. of pyridine. The resulting solution soon becomes viscous and within a few minutes is too viscous to stir. The reaction mixture is permitted to stand overnight before being combined with water to precipitate the polymer which is collected, washed with water, and dried. The copolymer obtained weighs 2.36 g., $\eta$inh = 1.85, and is comprised of random repeating units of

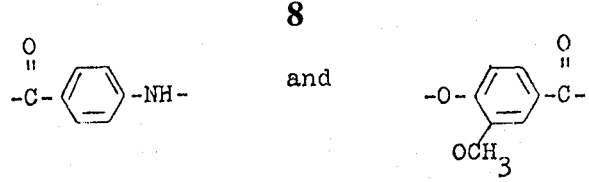

in the molar ratio of 8:1, respectively.

Part C

Into a dry tubular flask are placed 45 ml. of 2,4-dimethyltetramethylene sulfone, 3.11 g. (0.016 mole) of p-aminobenzoyl chloride hydrochloride, and 0.433 g. (0.002 mole) of 4-hydroxy-3,5-dimethoxybenzoyl chloride. To this stirred system are added 10.2 ml. of pyridine. The reaction mixture becomes viscous and is stirred for 2 hr. It is then permitted to stand overnight before being combined with water to precipitate the polymer which is collected, washed with water (3X) and once with 2B alcohol, and is vacuum dried. The copolymer obtained weighs 2.25 g., $\eta$inh = 1.01, and is comprised of random repeating units of

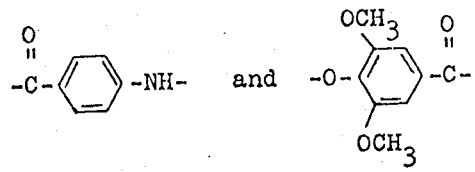

in the molar ratio of 8:1, respectively.

EXAMPLE V

This example illustrates further preparation of copolymers containing aromatic amide and polyester linkages; preparation of high strength fiber is also shown.

Part A

Into a dry tubular flask are placed 40 ml. 2,4-dimethyltetramethylene sulfone, 3.11 g. (0.016 mole) of p-aminobenzoyl chloride hydrochloride, and 0.44 g. (0.002 mole) of 4-hydroxy-3,5-dichlorobenzoyl chloride. To this stirred system are added 8.68 ml. of ethyldiisopropylamine. The resulting clear solution slowly becomes viscous and in about 0.5 hr. the viscous reaction mixture becomes unstirrable. The reaction mixture is permitted to stand for 1 hr. before being combined with water to precipitate the polymer which is collected, washed with water and with 2B alcohol and dried. The copolymer obtained weighs 2.12 g., $\eta$inh = 0.94, and is comprised of random repeating units of

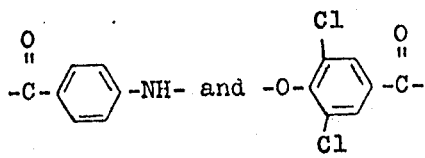

in the molar ratio of 8:1, respectively.

Part B

Into a Waring Blender are placed 225 ml. of 3-methyltetramethylene sulfone, 31.1 g. (0.16 mole) of p-aminobenzoyl chloride hydrochloride, and 4.4 g.

(0.02 mole) of 4-hydroxy-3,5-dichlorobenzoyl chloride. To this stirred system are added 40 ml. of pyridine. Stirring is continued for 0.5 hr., after which the reaction mixture is permitted to stand for 0.5 hr. It is then combined with water to precipitate the polymer which is collected, washed with water and with 2B alcohol, and vacuum dried. The copolymer obtained weighs 23.7 g., $\eta$inh = 1.51, and is comprised of repeating units as in Part A, above.

A quantity of the above-described copolymer is combined with N,N,N',N'-tetramethylurea containing 6.5% by weight lithium chloride to form a spinning composition containing approximately 20% by weight of the copolymer. This composition, maintained between about 105°–120° C., is extruded through a 5-hole spinneret, each hole of 0.013 cm. diameter, into a drying column maintained 195°–205° C. and which is swept with a cocurrent flow (0.142 m.$^3$/min.) of dry nitrogen which enters the column at a temperature between 230°–245° C. The emerging filaments are wound up at 119 m./min. and are treated with a mixture of water and detergent before being wound up. After the fibers are washed in water and are dried, they exhibit the following tensile properties: T/E/Mi/Den.: 1.3/0.6/220/7.0.

EXAMPLE VI

This example illustrates the preparation of a copolymer containing aromatic polyamide and polyester linkages according to the process of this invention.

Into a dry tubular flask are placed 40 ml. of 2,4-dimethyltetramethylene sulfone, 3.11 g. (0.016 mole) of p-aminobenzoyl chloride hydrochloride, and 0.38 g. (0.002 mole) of 4-hydroxy-3-chlorobenzoyl chloride. To this stirred system are added 8.68 ml. of ethyldiisopropylamine. The resulting slurry is stirred for about 2 hr., after which the reaction mixture is combined with water. The copolymer is isolated, washed, and dried to yield 2.33 g. of product, $\eta$inh = 0.67 (partly insoluble), comprising random repeating units of

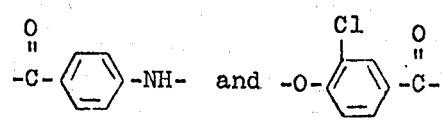

in the molar ratio of 8:1, respectively.

EXAMPLE VII

Presented in the following Table are other copolymers of this invention. They may be prepared from previously named comonomers by processes similar to those shown in the preceding examples.

TABLE

POLY(1,4-BENZAMIDE) COPOLYMERS

| ITEM | UNITS | Mole Ratio of Units |
|------|-------|---------------------|
| 1 | —NH—⟨⌬⟩—CO—/—NH(CH₂)₆NH—/—OC—⟨⌬⟩(Cl)—CO— | 90/5/5 |
| 2 | —NH—⟨⌬⟩—CO—/—N⟨piperazine⟩N—/—OC—⟨⌬⟩—CO— | 90/5/5 |
| 3 | —NH—⟨⌬⟩—CO—/—N(CH₃)—(CH₂)₆—N(CH₃)—/OC—⟨⌬⟩—CO— | 90/5/5 |
| 4 | —NH—⟨⌬⟩—CO—/—N⟨Me-piperazine⟩N—/—OC—⟨m-⌬⟩—CO— | 90/5/5 |
| 5 | —NH—⟨⌬⟩—CO—/NH(CH₂)₅—NH—/—OC—⟨m-⌬⟩—CO— | 80/10/10 |
| 6 | —NH—⟨⌬⟩—CO—/—NH(CH₂)₆—NH—/—SO₂—⟨⌬⟩—SO₂— | 90/5/5 |
| 7 | —NH—⟨⌬⟩—CO—/—N⟨piperazine⟩N—/SO₂—⟨⌬-CH₃⟩—SO₂— | 90/5/5 |
| 8 | —NH—⟨⌬⟩—CO—/—N⟨piperazine⟩N—/—SO₂—⟨m-⌬⟩—SO₂— | 90/5/5 |
| 9 | —NH—⟨⌬⟩—CO—/—NH(CH₂)₄NH—/—SO₂—⟨⌬⟩(Cl)—SO₂— | 80/10/10 |
| 10 | —NH—⟨⌬⟩—CO—/—O—⟨⌬⟩—CH₂—⟨⌬⟩—O—/—SO₂—⟨⌬⟩—SO₂— | 90/5/5 |

TABLE-continued
POLY(1,4-BENZAMIDE) COPOLYMERS

| ITEM | UNITS | Mole Ratio of Units |
|---|---|---|
| 11 | 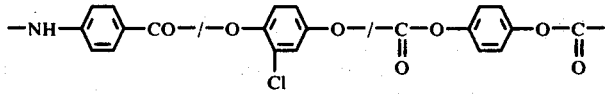 | 90/5/5 |
| 12 | 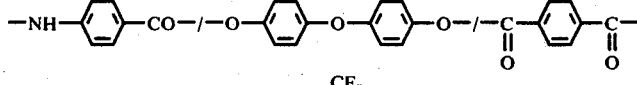 | 90/5/5 |
| 13 | 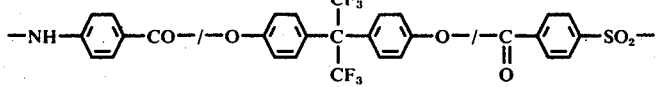 | 90/5/5 |
| 14 | 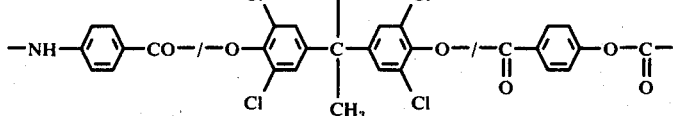 | 90/5/5 |

What is claimed is:

1. A copolymer having an inherent viscosity of at least 0.2 measured at 30° C using a solution containing 0.5 gm of the polymer in 100 ml of N,N-dimethylacetamide containing 6.5% by weight of lithium chloride, said copolymer comprising from about 80 to about 95 mol % of units of the formula

and the remaining units are selected from the groups of (1) —O—Y—CO— wherein Y is selected from the group of m- and p-phenylene radicals which may bear inert substituents and (2) —O—A—O— and —X—Y—X— wherein —O—A—O— is a diphenoxy radical derived from a p-oriented diphenolic reactant having one 6-membered carbocyclic ring; Y is as defined above; and X is selected from the group consisting of

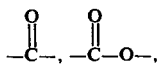

and —SO$_2$— radicals.

2. A copolymer according to claim 1 comprising from about 80 to about 95 mol % of units of the formula

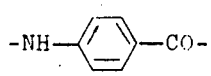

and the remaining units are —O—A—O— and —X—Y—X— wherein —O—A—O— is a diphenoxy radical derived from a p-oriented diphenolic reactant having one 6-membered carbocyclic ring; Y is selected from the group of m- and p-phenylene radicals which may bear inert substituents and X is selected from the group consisting of

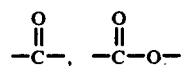

and —SO$_2$— radicals.

3. Novel copolymer according to claim 1 wherein at least about 80 mol % of units of the formula

and the remaining units being of the formula —O—Y—CO— wherein Y represents at least one member of the group of m- or p-phenylene radicals which may bear inert substituents.

4. A copolymer according to claim 2 consisting essentially of random repeating units of

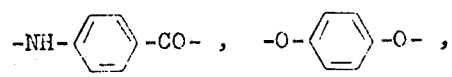

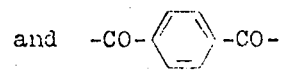

in the molar ratio of 90:5:5, respectively.

5. A novel copolymer according to claim 2 wherein X is

* * * * *